United States Patent [19]

Yoshida et al.

[11] Patent Number: 4,686,519
[45] Date of Patent: Aug. 11, 1987

[54] MULTICOLOR PICTURE DISPLAY DEVICE

[75] Inventors: Hirohiko Yoshida; Minoru Natori, both of Tokorozawa, Japan

[73] Assignee: Citizen Watch Co. Ltd., Tokyo, Japan

[21] Appl. No.: 690,071

[22] Filed: Jan. 9, 1985

[30] Foreign Application Priority Data

Jan. 10, 1984 [JP] Japan .................................. 59-2502

[51] Int. Cl.$^4$ .............................................. G09G 3/36
[52] U.S. Cl. ...................................... 340/701; 340/702; 340/703; 340/784; 340/785; 350/345
[58] Field of Search ............... 340/703, 700, 702, 763, 340/765, 701, 784, 785; 350/402, 286, 345, 424, 436, 447; 362/326, 337, 339, 299, 308

[56] References Cited

U.S. PATENT DOCUMENTS

| | | | |
|---|---|---|---|
| 3,331,920 | 7/1967 | Larson | 340/701 X |
| 3,758,195 | 9/1973 | Hedman, Jr. et al. | 340/703 X |
| 3,899,786 | 8/1975 | Greuber et al. | 340/703 |
| 4,126,382 | 11/1978 | Barzilai et al. | 350/339 F |
| 4,295,093 | 10/1981 | Middleton | 340/702 X |
| 4,328,493 | 5/1982 | Shanks et al. | 340/703 X |
| 4,582,396 | 4/1986 | Bos et al. | 340/702 X |

FOREIGN PATENT DOCUMENTS 58-25690 2/1983 Japan .
58-59691 4/1983 Japan .

Primary Examiner—Gerald L. Brigance
Assistant Examiner—Jeffery A. Brier
Attorney, Agent, or Firm—Pollock, VandeSande & Priddy

[57] ABSTRACT

A display device includes a spectroscopic unit for making a corresponding spectral diffraction in accordance with wavelengths of light and an image display unit including a light valve which has a plurality of picture elements. The light valve receives the light-subjected to assortment by color with the spectroscopic unit and controls the light quantity of outgoing light, respectively, thereby passing any light of the three primary colors.

8 Claims, 6 Drawing Figures

MULTICOLOR PICTURE DISPLAY DEVICE

BACKGROUND OF THE INVENTION

The present invention relates to a multicolor picture display device of a passive type such as a display panel of, for example, a color liquid crystal television receiver.

There has, recently, been developed a display panel employing a passive display element such as a liquid crystal element and utilized in a number of applications. One of these applications is a technique for determining the color of respective picture elements arranged in matrix by a multicolor filter. The picture elements are arranged in the stripe or mosaic fashion, and the brightness of these picture elements are separately controlled, thereby generating a multicolor video or picture.

FIG. 1 shows a principle of a conventional multicolor video liquid crystal display device. Substantially white light is incident on a color filter 2 from a light source 1. The color filter 2 comprises three respective primary R, G and B color regions corresponding to a number of electrodes 6 of a liquid crystal light valve 3. "Light valve" is to be understood to mean herein a device for controlling outgoing light quantity in accordance with incident light quantity so that the outgoing light quantity may be made zero. The light valve 3 comprises signal electrodes 6, a plurality of scanning electrodes 5, liquid crystal material 4 sandwiched by these electrodes 6 and 5, and upper and lower glass plates 7 and 8 for sandwiching these electrodes 6 and 5 therebetween, thereby forming a number of picture elements arranged in matrix. After passing the light L through the color filter 2, respective picture elements of the light valve 3 pass the light having any one of the three primaries R, G and B. In this case the passing amount of light is controlled by a voltage applied between the signal electrodes 6 and the scanning electrodes 5. When using the liquid crystal in a mode such as TN (twisted nematic) mode - which utilizes polarization, the upper and lower glass plates 7 and 8 are provided with a polarizing plate (not shown) respectively. In this way a video image or picture of natural color can be displayed. In the conventional passive multicolor display device, however, effective light quantity becomes decreased to about ⅓ of incident light since the color filter is utilized to obtain color light from white color light. In order to display an image with natural color, in addition to the decrease of light quanitity caused by the filter the decrease of light quantity in the light valve must further be taken into account. Conventional display device, therefore, has a problem of brightness in display. For example, it is impossible to recognize an image or picture under usual room brightness, so that it is necessary to utilize a special light source for illumination. In this case the light source must necessarily have to be very bright. This results in the power consumption for illumination becoming very large. Therefore, in the case of a small and portable display device such as a pocketable television, the lifetime of a battery cell becomes very short or the display becomes very dark.

SUMMARY OF THE INVENTION

It is an object of the present invention to overcome the above described disadvantages of the conventional display device.

It is another object of the present invention to provide a multicolor picture display device capable of obtaining large brightness without decreasing effective light quantity.

According to the present invention there is provided a multicolor picture display device comprising means for making a corresponding spectral diffraction in accordance with wavelengths of light. The display device further comprises an image display unit including a light valve which has a plurality of picture elements. The light valve performs a function of receiving the light subjected to assortment by color with the spectroscopic means and controlling the light quantity of outgoing light, respectively, thereby passing any light of three primary colors.

BRIEF DESCRIPTION OF THE DRAWING

These and other features and advantages of the present invention will become readily apparent from the following detailed description of one embodiment of the present invention, particularly when taken in connection with the accompanying drawings wherein like reference numerals designate like or functionally equivalent parts throughout, and wherein.

DESCRIPTION OF THE PREFERRED EMBODIMENT

Figure 3:
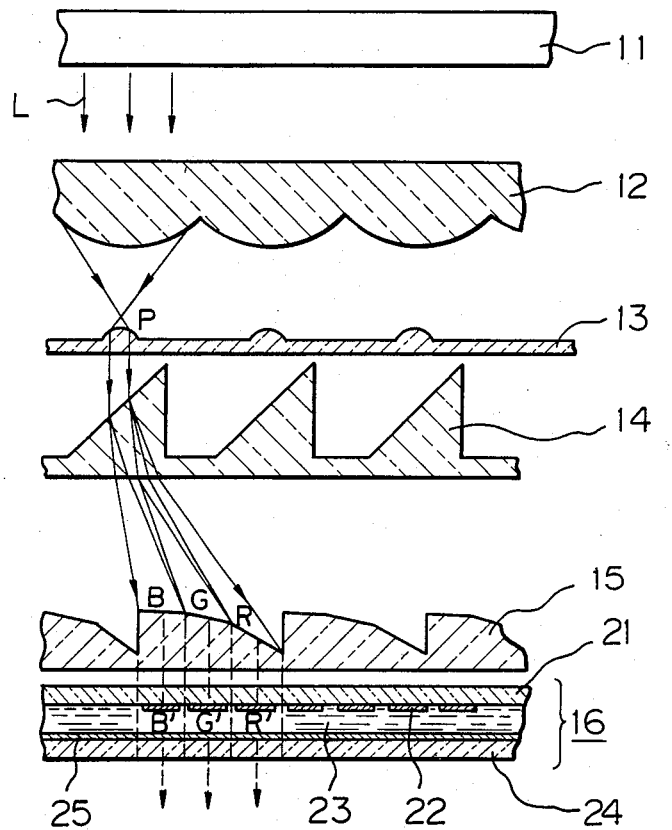
FIG. 3 is a sectional view showing one embodiment of the multicolor picture display device according to the present invention.

Referring to FIG. 3, there is shown an embodiment of a multicolor picture display device according to the present invention.

Figure 1:
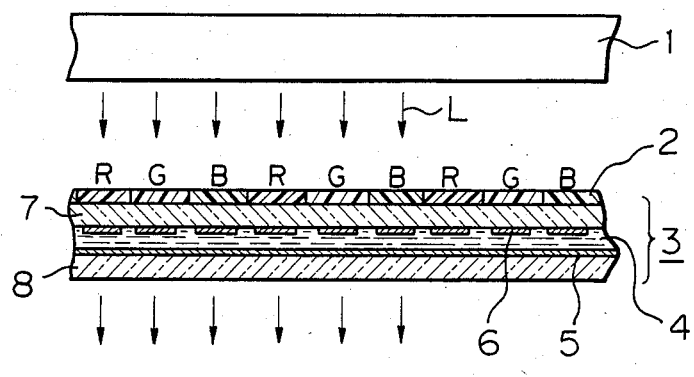
FIG. 1 is a sectional view showing the principle of a conventional multicolor video liquid crystal display device.
Figure 2:
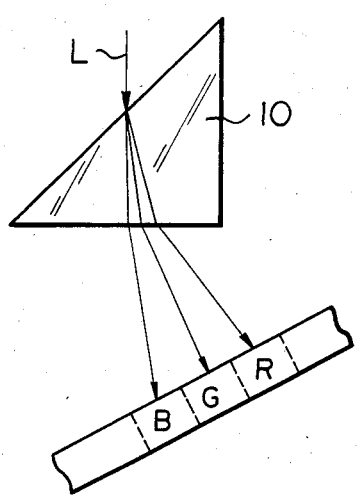
FIG. 2 is an explanatory view showing a principle of a multicolor picture display device according to the present invention.

FIG. 2 shows a principle of the multicolor picture display device. According to the present invention use is made of means for making a corresponding spectral diffraction in accordance with wavelengths of light, thereby converting a wide collimated light into a narrow collimated light. This is necessitated by the fact that if the wide collimated light is directly incident on the spectroscopic means, the width of outgoing light beam becomes large. In this case the width of color regions R, G, B becomes large so that the wavelength component of, for example R, is also incident on a plurality of adjacent picture element regions. In order to avoid this defect the brightness must be sacrificed so that one color wavelength component must be incident on only one picture element region.

If wide collimated light is incident on the spectroscopic means, the outgoing light is divided into three color components R, G and B far from the spectroscopic means so that the device becomes large.

According to utilization of the above spectroscopic means shown in FIG. 2, narrow collimated light can be obtained at incident side of the spectroscopic means so that outgoing light can be divided into three components R, G and B near the spectroscopic means, and thus the display device can be made small. FIG. 3 shows one embodiment of the multicolor picture display device according to the present invention. The display device comprises a light source 11, a first lens system 12, a second lens system 13, a prism system 14 as a spectroscopic means, a third lens system 15 (not including the spectroscopic function), and a liquid crystal light valve 16, arranged as listed. Substantially white collimated light obtained from the light source 11 is incident on the first lens system 12. This incident light is condensed at a point P which is a focus of the first lens system 12 and a focus of the second lens system having a shorter focus length than that of the first lens system. Near point P, the condensed light passes through the second lens system 13, resulting in a parallel or substantially parallel light beam which is smaller than that incident on the first lens system. This narrow and parallel light beam or flux is incident on and refracted by the first prism system 14. Since the refractive indexes are increased, depending on wavelength, in the prism system 14, the wavelengths of R, G and B become correspondingly smaller, thus the bending angle of the light beam becomes large due to refraction. The light beam becomes wide as a whole with continuous wavelength and is divided into three color regions in order of three primary components B, G and R from left to right in FIG. 3. The three primary components thus fall as different light beams incident on the surfaces B, G and R of the third lens system 15. The surfaces B, G and R have different inclined angles, respectively.

Figure 4:
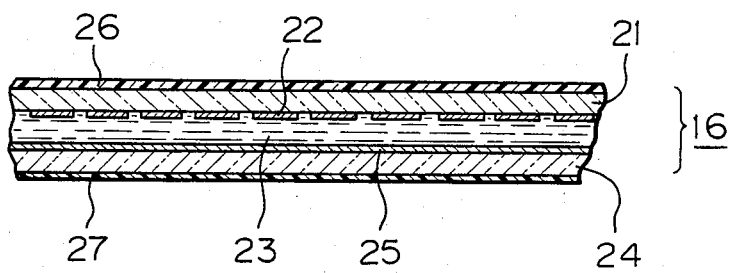
FIG. 4 is an enlarged sectional view illustrating a modification of the liquid crystal light valve shown in FIG. 3.

These light beams or fluxes are refracted with different angles, respectively, and incident on respective picture elements B', G' and R' of the liquid crystal light valve 16 as a parallel light beam or flux with different color. The liquid crystal light valve 16 comprises an upper transparent base plate 21, a number of transparent signal electrodes 22 provided to the plate 21, a liquid crystal material 23, a lower transparent base plate 24, and a number of transparent scanning electrodes 25 provided to the lower plate 24 for forming picture elements in the matrix form, by sandwiching the liquid crystal material 23 between electrodes 22 and 25. Respective picture elements of the light valve 16 pass the light with any one of three primaries R, G and B and control passing amount of light by a voltage applied between the signal electrodes 22 and the scanning electrodes 25, resulting in a display of video image or picture with natural color. FIG. 4 shows a modification of the display device shown in FIG. 3. In this modification the upper and the lower base plates 21 and 24 are provided with polarizing plates 26 and 27, respectively. This is the case when the liquid crystal is used under the mode -for example, such as TN mode- for utilizing polarization.

Figure 5:
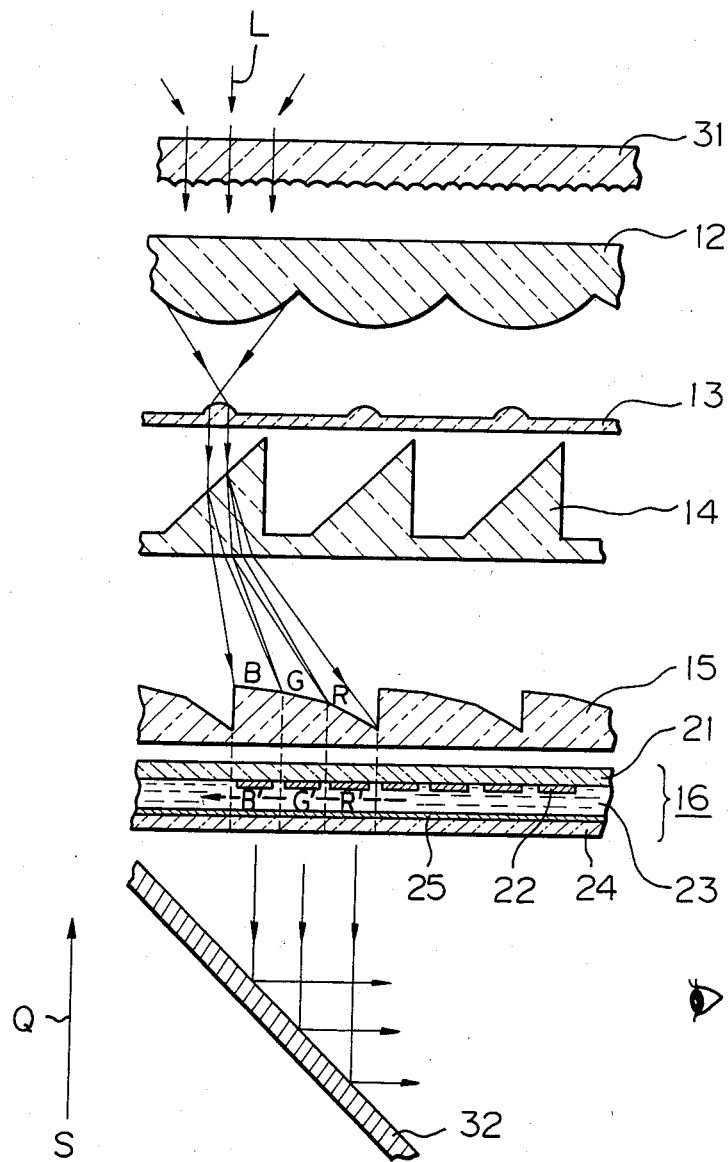
FIG. 5 is a sectional view showing another embodiment of the multicolor picture display device according to the present invention.

FIG. 5 shows another embodiment of the multicolor picture display device according to the present invention. In this embodiment a scattering plate 31 is provided (instead of the light source 11) so as to receive external light from various angles and to make substantially collimated light incident on the first lens system 12. Reference numeral 32 is a reflection mirror for reflecting the light passed through the light valve 16 thereby causing a mirror image Q with natural color to be displayed horizontally. This results in a capability for viewing an image with natural color from the right side of the drawing. The construction and advantageous effect of the other portions of the FIG. 5 embodiment are the same as those of FIG. 3 so that the explanations thereof are omitted.

Figure 6:
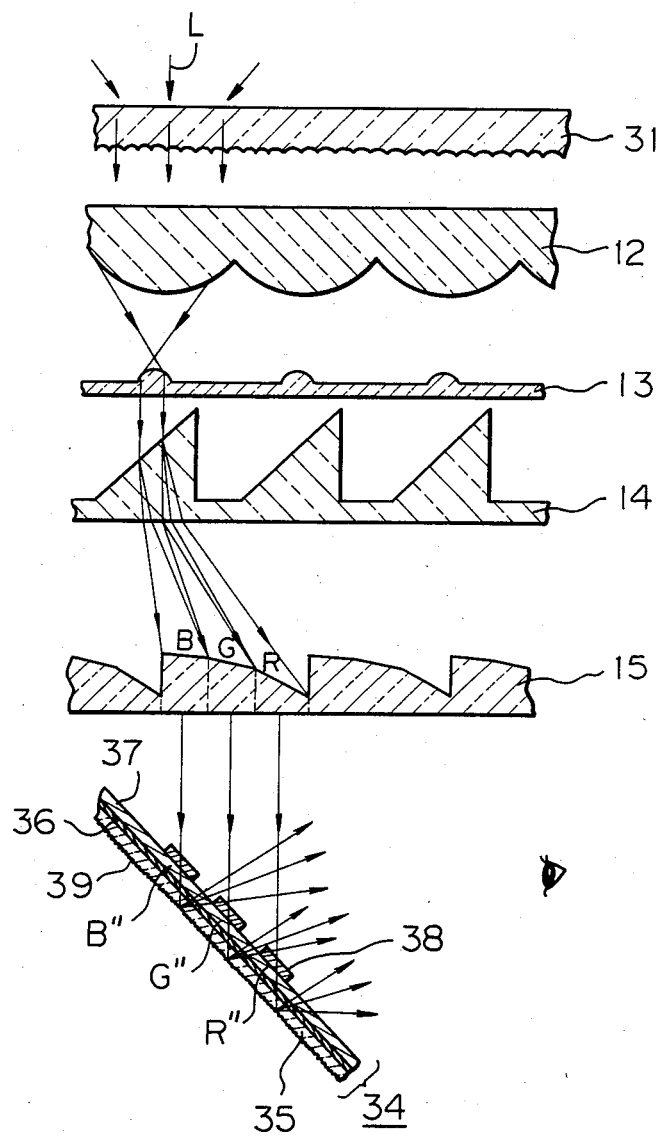
FIG. 6 is a sectional view showing still another embodiment of the multicolor picture display device according to the present invention.

FIG. 6 shows a further embodiment of the multicolor picture display device according to the present invention. In this embodiment an electrochromic light valve 34 is provided instead of the liquid crystal light valve 16 shown in FIGS. 3 and 5. The light valve 34 comprises a lower transparent base plate 35, a plurality of transparent scanning electrodes 36, an electrochromic (EC) material 37 stacked or laminated thereon, a plurality of transparent signal electrodes 38 laminated thereon and a reflection coating 39 provided on the undersurface of lower base plate 35. The EC material 37 is sandwiched between the signal electrodes 38 and the scanning electrodes 36 thereby forming matrix shaped picture elements. The light beam or flux transmitted through the prism system 14 and collimated by the third lens system 15 is divided into color regions in order of three primary components B, G and R from the left side of the drawing and incident on respective picture elements B", G" and R" of the electrochromic light valve 34. Respective picture elements control the strength of incident light on the reflection coating, thereby causing irregular reflection. And the reflection light from the reflection coating passing through the EC material 37 is controlled under the regulation of voltage applied between the signal electrodes and the scanning electrodes so that the strength of outgoing light for every picture element to the outside may be finally controlled separately. This results in a capability of viewing video image with natural color from the right side of the drawing.

In the embodiment shown in FIG. 6, alternatively, a liquid display element of reflection type, instead of the electrochromic display element of reflection type, can be utilized as a light valve. Though the first, second and third lens systems are utilized in all of the embodiments shown in FIGS. 3, 5 and 6, these lens systems may be omitted, as the prism system individually can provide the above described advantageous effects. If only the prism is used, the brightness obtained by the display device according to the present invention becomes darker.

As described above, according to the present invention respective picture elements are subjected to sorting by color with the spectroscopic means without utilizing color filter (which absorbs light) as in the prior art. Consequently, a brightness which is about three times as much as in the prior art is obtained and thus the video image with natural color can easily be seen without having an unusually bright illuminating light source in the room, so that a portable color display device such as a portable color television with pocketable size can be obtained with sufficient brightness from a battery cell and the lifetime of the battery cell is not shortened.

What is claimed is:

1. A multicolor picture display device, comprising:
   means for emitting collimated white light;
   prismatic means for spectroscopically separating the collimated white light into three primary color light components;
   a light valve for receiving the separated color light components, the light valve including a plurality of transparent scanning electrodes and a plurality of transparent signal electrodes superposed thereover for forming a plurality of picture elements, each of the picture elements having incident thereon a respective one of the color light components;

wherein the picture elements respectively pass the light components and modulate the light quantities of the components incident thereon, thereby effecting a bright and energy efficient multicolor picture.

2. A multicolor picture display device as claimed in claim 1, wherein the prismatic means comprises a prism array.

3. A multicolor picture display device as claimed in claim 1, wherein the light valve is a liquid crystal display device comprising a liquid crystal material interposed between the scanning and signal electrodes.

4. A multicolor picture display device as claimed in claim 1, wherein the light valve is an electrochromic display device comprising an electrochromic material interposed between the scanning and signal electrodes.

5. A multicolor picture display device as claimed in claim 3, wherein the liquid crystal display device is a twisted nematic liquid crystal device having polarizing means.

6. A multicolor picture display device as claimed in claim 1, wherein means for emitting collimated white light comprises an optical system including a first lens system and a second lens system.

7. A multicolor picture display device as claimed in claim 6, wherein the first lens system comprises a condenser lens and the second lens system comprises a collimating lens.

8. A multicolor picture display device according to claim 2, wherein said means for emitting collimated white light comprises first and second lenses interposed between the emitting means and the prism array, the first lens converging the collimated white light and the second lens collimating the thus converged white light.

* * * * *